(12) United States Patent
Chen et al.

(10) Patent No.: US 7,480,135 B2
(45) Date of Patent: Jan. 20, 2009

(54) COMPUTER ENCLOSURE WITH SIMPLE DRIVE BRACKET

(75) Inventors: Yun-Lung Chen, Shenzhen (CN);
Da-Long Sun, Shenzhen (CN)

(73) Assignees: Hong Fu Jin Precision Industry (ShenZhen) Co., Ltd., Shenzhen Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 362 days.

(21) Appl. No.: 11/306,467

(22) Filed: Dec. 29, 2005

(65) Prior Publication Data

US 2007/0153468 A1  Jul. 5, 2007

(51) Int. Cl.
*H05K 7/18* (2006.01)

(52) U.S. Cl. .................. 361/685; 62/259.2; 16/337; 248/223.41

(58) Field of Classification Search .............. 312/223.2, 312/257.1, 265.5; 62/259.2; 165/104.33, 165/80.4; 16/337; 248/223.41; 345/173; 361/679–687, 724–727
See application file for complete search history.

(56) References Cited

U.S. PATENT DOCUMENTS

| 6,000,767 A | 12/1999 | Liu et al. | |
|---|---|---|---|
| 6,644,762 B1 * | 11/2003 | Chen | 312/223.2 |
| 6,826,039 B2 | 11/2004 | Chen | |
| 6,885,550 B1 * | 4/2005 | Williams | 361/685 |
| 2006/0050479 A1 * | 3/2006 | Lai | 361/685 |

* cited by examiner

*Primary Examiner*—Hung V Duong
(74) *Attorney, Agent, or Firm*—Wei Te Chung

(57) ABSTRACT

A computer enclosure includes a base (70), a support plate (20), and a front plate (10). The support plate is secured to the base. The front plate is secured between the base and the support plate. The front plate defines an opening (12) therein for receiving a data storage device. A retaining clip (16) is bent from the front plate, and opposite to and generally parallel to the support plate. The retaining clip together with the support plate is in use for supporting the data storage device.

19 Claims, 3 Drawing Sheets

COMPUTER ENCLOSURE WITH SIMPLE DRIVE BRACKET

FIELD OF THE INVENTION

The present invention relates to computer enclosures, and more particularly to a computer enclosure having a simple drive bracket for accommodating data storage devices such as hard disk drives, floppy disk drives, CD-ROM (Compact Disk Read-Only Memory) drives, etc.

DESCRIPTION OF RELATED ART

A typical computer enclosure includes a base, a cover, and a front bezel secured to a front end of the base. The base includes a side plate, a top plate, a bottom plate, a rear plate, and a front plate. The top plate, the bottom plate, the rear plate, and the front plate are formed at adjacent edges of the side plate, thereby forming an opening. The cover is used to cover the opening, and facilitates preventing EMI (Electro Magnetic Interference) from leaking from the computer enclosure.

Furthermore, a drive bracket is usually installed into the base adjacent to the front plate, and accommodates a plurality of data storage devices therein. The drive bracket is generally secured to the base with a plurality of screws or stakes, and usually includes a bottom wall, and a pair of sidewalls extending from the bottom wall. Another kind of drive bracket includes a first bracket body and a second bracket body. Both the first and second bracket bodies are used to accommodate different data storage devices. The second bracket body is usually secured to a bottom wall of the first bracket body, which is secured to the base.

However, the typical computer enclosure usually has a complicated structure, more particularly it has a drive bracket with a complicated structure, thereby increasing the manufacturing cost and the amount of manufacturing material thereof.

What is needed, therefore, is a computer enclosure having a simple structure, more particularly having a simple drive bracket which reduces the manufacturing cost and the amount of manufacturing material thereof.

SUMMARY OF INVENTION

A computer enclosure includes a base, a support plate, and a front plate. The support plate is secured to the base. The front plate is secured between the base and the support plate. The front plate defines an opening therein for receiving a data storage device. A retaining clip is bent from the front plate, and opposite to and generally parallel to the support plate. The retaining clip together with the support plate is in use for supporting the data storage device.

Other advantages and novel features will be drawn from the following detailed description of preferred embodiments with attached drawings, in which:

DETAILED DESCRIPTION

Figure 1:
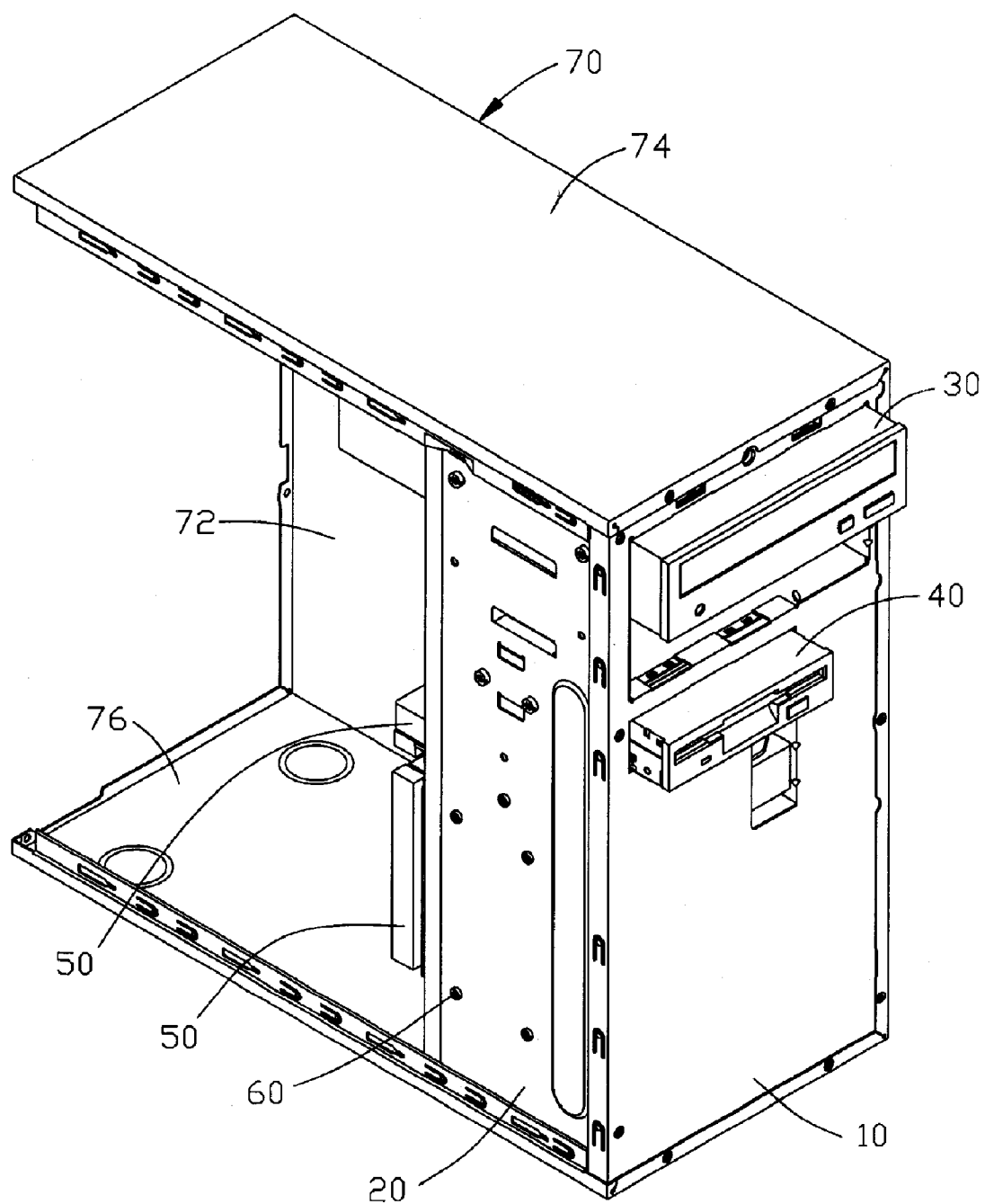
FIG. 1 is an assembled, isometric view of a computer enclosure and a plurality of data storage devices in accordance with a preferred embodiment of the present invention, the computer enclosure including a base, a support plate, and a front plate.

Referring to FIG. 1, a computer enclosure includes a base 70, a front plate 10 attached to the base 70, and a support plate 20 secured to the base 70 and perpendicular to the front plate 10. A plurality of data storage devices is installed in the computer enclosure. The data storage devices may include, for example, a CD-ROM drive 30, a floppy disk drive 40, and two hard disk drives 50.

Figure 2:
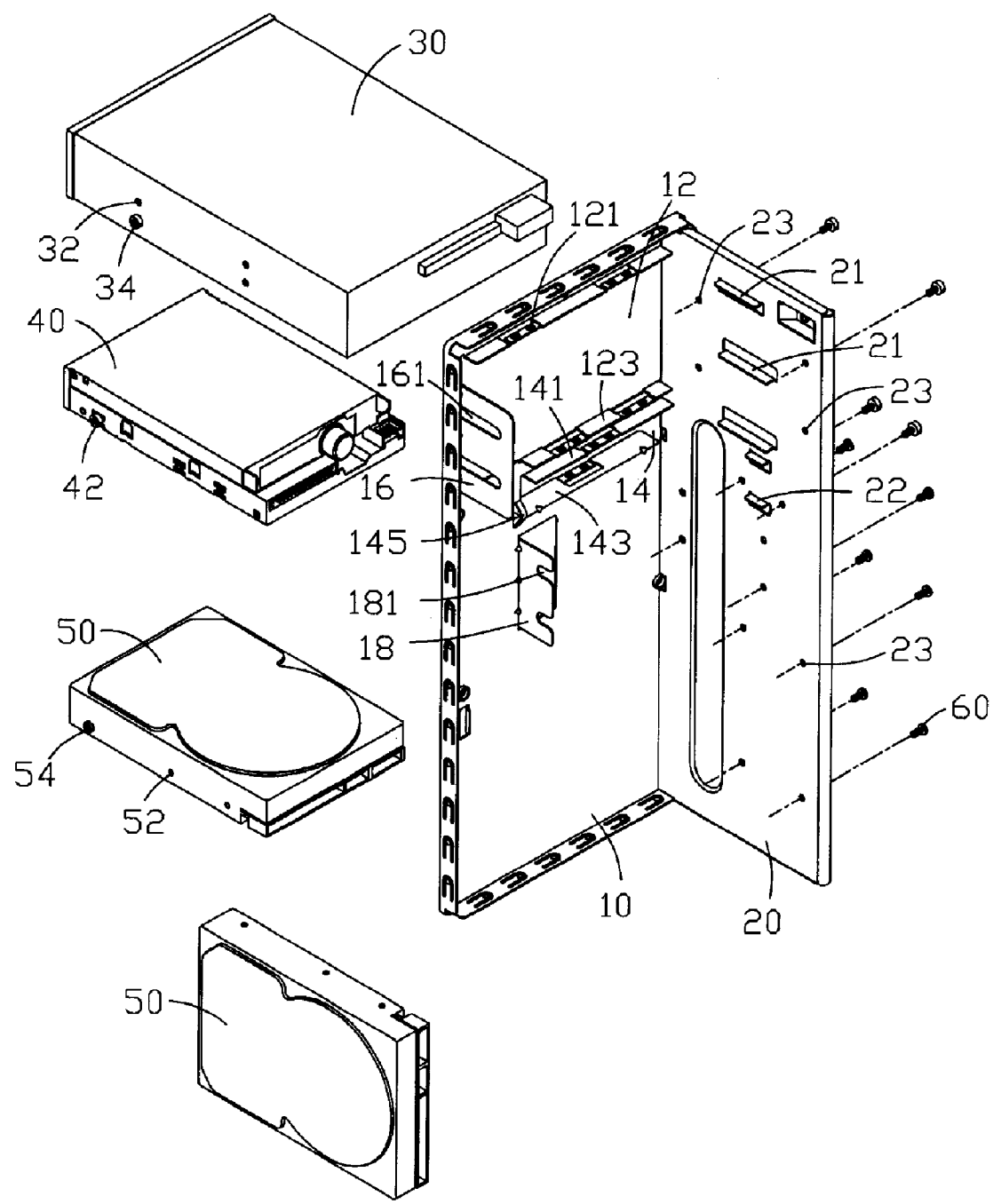
FIG. 2 is an exploded, isometric view of the front plate, the support plate, and the data storage devices of FIG. 1, and showing the support plate secured to the front plate.

Referring also to FIG. 2, the CD-ROM drive 30 defines a plurality of securing holes 32 therein. A post 34 is fixed into one of the securing holes 32 of the CD-ROM drive 30. The floppy disk drive 30 has a post 42 disposed thereon. Each of the hard disk drives 50 defines a plurality of securing holes 52 therein. A post 54 is fixed into one of the securing holes 52 of one of the hard disk drives 50. In the preferred embodiment, the posts 34, 42, 54 can be screws.

Referring also to FIG. 1, the base 70 is generally U-shaped, and includes a side plate 72, a top plate 74, and a bottom plate 76. The top plate 74 and the bottom plate 76 are perpendicularly bent from opposite edges of the side plate 72 in a same direction, respectively.

Referring also to FIG. 2, the front plate 10 is secured to a front end of the base 70, with a plurality of fasteners (not shown), such as screws or stakes. A large opening 12 is defined in a top portion of the front plate 10, for receiving the CD-ROM drive 30, and a small opening 14 is defined therein below the large opening 12, for receiving the floppy disk drive 40. A pair of support flanges 121, 123 is inward bent from top and bottom edges of the large opening 12 respectively, for supporting the CD-ROM drive 30. A first retaining clip 16 is inward bent from a side edge of the large opening 12. Two parallel guiding slots 161 are defined in the retaining clip 16, for receiving the post 34 of the CD-ROM drive 30. Each guiding slot 161 has a block end distant from the front plate 10. A support flange 141 is bent inward from the top edge of the small opening 14, and a support flange 143 is bent outward from the bottom edge of the small opening 14, for supporting the floppy disk drive 40. An arc-shaped stop portion 145 protrudes inward from a side of the small opening 14, adjacent to the first retaining clip 16, thereby providing a space to receive the post 42 of the floppy disk drive 40. A second retaining clip 18 is inward formed on the front plate 10 below the small opening 14 by stamping, and parallel to the first retaining clip 16. Two cutouts 181, for receiving the post 54 of the hard disk drive 50, are defined at an edge of the second retaining clip 18, which is distant from the front plate 10.

The support plate 20 connects with the top plate 74, the bottom plate 76, and the front plate 10. The support plate 20 is generally parallel to the retaining clips 16, 18 of the front plate 10. Three long support clips 21 are inward formed on a top portion of the support plate 20, for supporting the CD-ROM drive 30. Two short support clips 22 are inward formed on the support plate 20, below the long support clips 21, for supporting the floppy disk drive 40. The support plate 20 defines a plurality of through holes 23 therein, as shown in FIG. 2.

Figure 3:
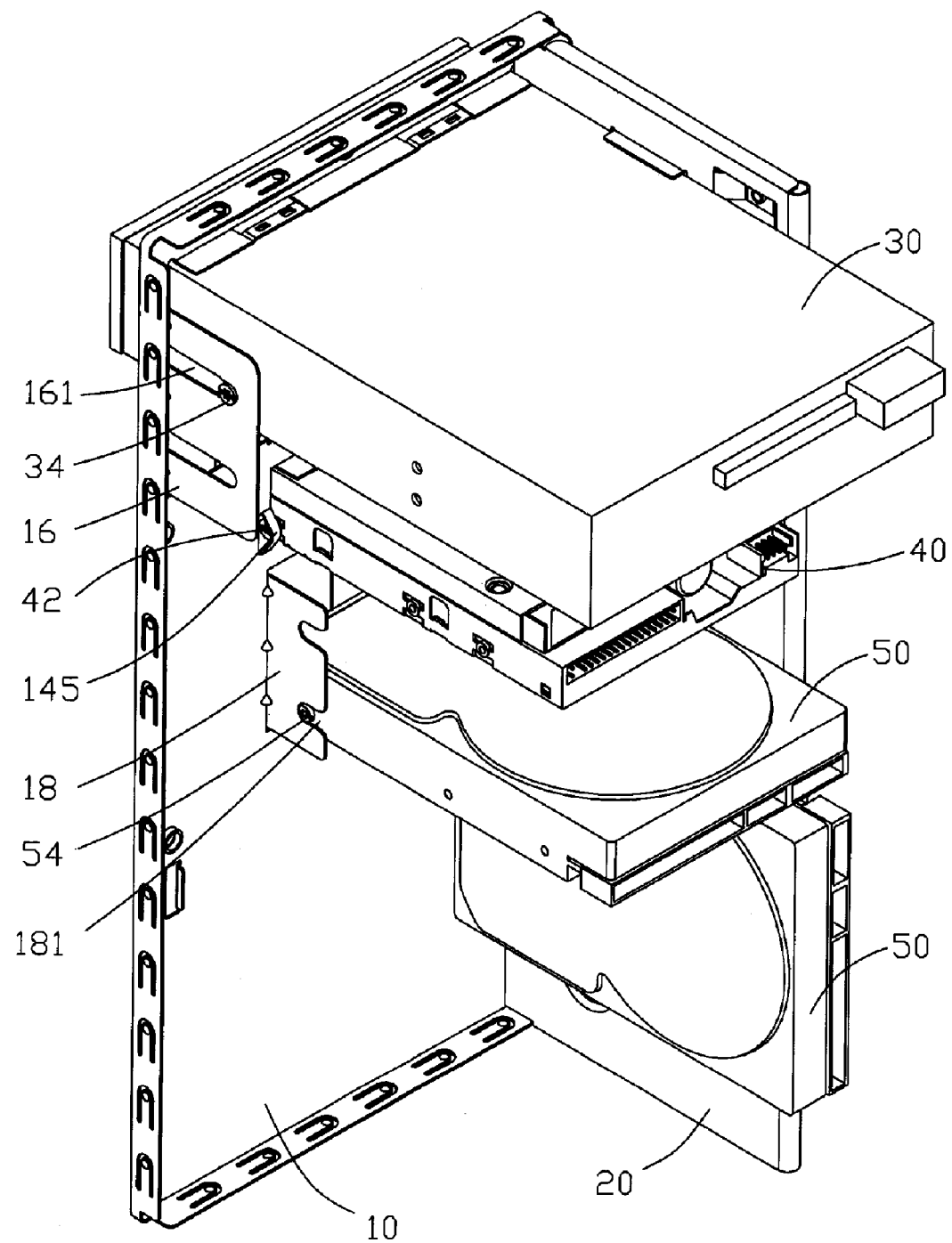
FIG. 3 is an enlarged, assembled view of FIG. 2.

Referring also to FIGS. 1 and 3, in assembly of the CD-ROM drive 30, the CD-ROM drive 30 is inserted through the large opening 12. The CD-ROM drive 30 is slidably sandwiched between one pair of the large support clips 21 of the support plate. The post 34 of the CD-ROM drive 30 is slidably received in the guiding slot 161. When the post 34 is stopped by the block end of the guiding slot 161, two of the securing holes 32 of the CD-ROM drive 30 are aligned with the through holes 23 defined between the support clips 21. Then, two fasteners 60 are engaged into the securing holes 23, thereby stably securing the CD-ROM drive 30 to the computer enclosure.

The mounting of the floppy disk drive 40 is similar to that of the CD-ROM drive 30 as described above. The floppy disk drive 40 is inserted into the small opening 14, and sandwiched by the support flanges 141, 143, and the pair of short support clips 22. Then the floppy disk drive 40 is secured in the computer enclosure, with two fasteners 80 engaged into two securing holes 52 of the floppy disk drive 40, through corresponding through holes 23 of the support plate 20. At the same time, the post 42 of the floppy disk drive 40 is blocked by the stop portion 145 of the front plate 10.

In installing one of the hard disk drives 50, the post 54 is received into one of the cutouts 181 of the second retaining clip 18. When two of the securing holes 52 of the hard disk drive 50 are aligned with two through holes 23 of the support plate 20. Two fasteners 80 are engaged into the securing holes 52 through the through holes 23, thus firmly securing the hard disk drive 50 to the computer enclosure.

The other one of the hard disk drives 50 may be mounted directly to the support plate 20 with a plurality of fasteners 80 mounted into securing holes defined in the hard disk drive 50, through corresponding through holes 23.

In the preferred embodiment, the fasteners 80 can be screws.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
   a base;
   a support plate secured to the base; and
   a front plate secured between the base and the support plate, the front plate defining an opening therein for receiving a data storage device, a retaining clip bent from an edge of the opening which is distant from the support plate, and generally parallel to the support plate, the retaining clip together with the support plate being configured for supporting the data storage device.

2. The computer enclosure as described in claim 1, wherein an arc-shaped stop portion protrudes from a side of the opening, thereby defining a space for receiving a post disposed on the data storage device.

3. The computer enclosure as described in claim 1, wherein a plurality of support clips is formed on the support plate for retaining the data storage device.

4. The computer enclosure as described in claim 1, wherein a pair of support flanges, perpendicular to the retaining clip of the front plate, is inward bent from opposite edges of the opening of the front plate respectively, for supporting the data storage device.

5. The computer enclosure as described in claim 1, wherein the retaining clip defines a guiding slot therein for receiving a post disposed on the data storage device, and the guiding slot has a block end, adjacent to an end of the retaining clip distant from the front plate, for blocking the post of the data storage device.

6. The computer enclosure as described in claim 1, wherein the retaining clip defines a cutout at an edge of the retaining clip distant from the front plate, for receiving a post disposed on the data storage device.

7. The computer enclosure as described in claim 6, wherein the support plate defines a plurality of through hales therein, for receiving at least one fastener which is mounted into the data storage device through the through holes when the post is received into the cutout of the retaining clip.

8. A computer system, comprising:
   a data storage device with a post disposed thereon;
   a base;
   a support plate secured to the base, and defining a plurality of through holes therein; and
   a front plate secured to the base, and perpendicular to the support plate, a retaining clip bent from the front plate, and spaced from and generally parallel to the support plate, a guideway provided at the retaining clip;
   wherein the post of the data storage device is slid and engaged into the guideway, a plurality of fasteners engages into the data storage device through the through boles of the support plate, thereby securing the data storage device between the retaining clip and the support plate.

9. The computer system as described in claim 8, wherein a plurality of support clips is formed on the support plate for retaining the data storage device.

10. The computer system as described in claim 8, wherein the front plate defines an opening therein, and the retaining clip is bent from an edge of the opening of the front plate.

11. The computer system as described in claim 10, wherein a pair of support flanges, perpendicular to the retaining clip of the front plate, is inward bent from opposite edges of the opening of the front plate respectively, for supporting the data storage device.

12. The computer system as described in claim 10, wherein the guideway is an arc-shaped stop portion protruding from a side of the opening of the front plate.

13. The computer system as described in claim 10, wherein the guideway is a guiding slot defined in the retaining clip, and the guiding slot has a block end adjacent to an end of the retaining clip distant from the front plate, for blocking the post of the data storage device.

14. The computer system as described in claim 10, wherein the guideway is a cutout defined at an edge of the retaining clip distant from the front plate.

15. A computer enclosure comprising:
   a front plate defining therein an opening being configured for receiving a data storage device therethrough;
   a top plate formed at a top edge of the front plate;
   a bottom plate formed at a bottom edge of the front plate opposite to the top edge thereof;
   a support plate located at one side of the opening and connected between the top plate and the bottom plate; and
   a retaining member located at an opposite side of the opening;
   the support plate and the retaining member being independent from each other, and comprising a mounting mechanism configured for positioning the data storage device between the support plate and the retaining member.

16. The computer enclosure as described in claim 15, wherein the retaining member as bent from the front plate, and generally parallel to the support plate.

17. The computer enclosure as described in claim 15, wherein the mounting mechanism comprises a guiding slot defined in the retaining member for receiving a post disposed on the data storage device, and the guiding slot has a block end for blocking the post of the data storage device.

18. The computer enclosure as described in claim 17, wherein the mounting mechanism further comprises a plurality of support clips formed on the support plate for retaining the data storage device.

19. The computer enclosure as described in claim 18, wherein the mounting mechanism further comprises a plurality of through holes defined in the support plate, between the support clips, for receiving at least one fastener which is mounted into the data storage device through the through holes.

* * * * *